United States Patent
Fox

(10) Patent No.: US 10,891,713 B2
(45) Date of Patent: Jan. 12, 2021

(54) METHOD AND SYSTEM FOR RENDERING IMAGE ON CONICAL SURFACE

(71) Applicant: HUHTAMAKI CUPPRINT LTD, Ennis (IE)

(72) Inventor: Terry Fox, Ennis (IE)

(73) Assignee: HUHTAMAKI CUPPRINT LTD, Ennis (IE)

( * ) Notice: Subject to any disclaimer, the term of this patent is extended or adjusted under 35 U.S.C. 154(b) by 0 days.

(21) Appl. No.: 16/465,365

(22) PCT Filed: Nov. 30, 2017

(86) PCT No.: PCT/EP2017/081080
§ 371 (c)(1),
(2) Date: May 30, 2019

(87) PCT Pub. No.: WO2018/100115
PCT Pub. Date: Jun. 7, 2018

(65) Prior Publication Data
US 2019/0392553 A1 Dec. 26, 2019

(30) Foreign Application Priority Data
Nov. 30, 2016 (GB) .................................. 1620272.3

(51) Int. Cl.
*G06T 3/00* (2006.01)
*H04N 1/00* (2006.01)
(Continued)

(52) U.S. Cl.
CPC ........ *G06T 3/0093* (2013.01); *G06K 15/1842* (2013.01); *H04N 1/387* (2013.01)

(58) Field of Classification Search
CPC .... G06T 3/0093; G06K 15/1842; B65D 3/22; B65D 3/28; B65D 81/3869; B65D 81/3874; Y10S 229/939; Y10S 493/907
(Continued)

(56) References Cited

U.S. PATENT DOCUMENTS 5,948,728 A * 9/1999 Patton ...................... B41M 1/34
156/235
6,257,485 B1 * 7/2001 Sadlier ..................... B65D 3/22
229/198.2
(Continued)

FOREIGN PATENT DOCUMENTS

| CN | 105678692 A | 6/2016 |
| JP | 2007-41990 A | 2/2007 |
| WO | 2007/138866 A1 | 12/2007 |

OTHER PUBLICATIONS

Title: KNK Zing/Zing Air with Make the Cut. Copyright date: Feb. 28, 2014. Link: https://www.iloveknk.conn/0um/KNKZing/KNKZingwithMTCUserManual.pdf. (Year: 2014).*
(Continued)

*Primary Examiner* — Chad Dickerson
(74) *Attorney, Agent, or Firm* — Novick, Kim & Lee, PLLC; Sang Ho Lee

(57) ABSTRACT

Provided are an automated process and system for rendering an image on a conical surface, the process comprising: transforming a two-dimensional (2D) planar representation of an image to a 2D planar representation of the image configured for a conical shape; applying the 2D transformed representation onto a planar template; and manufacturing a conically-shaped object from the planar template on which the 2D transformed representation has been applied.

14 Claims, 6 Drawing Sheets

(51) Int. Cl.
*G06K 15/02* (2006.01)
*H04N 1/387* (2006.01)
*G06F 3/12* (2006.01)

(58) Field of Classification Search
USPC .............. 358/1.6; 229/198.2, 403, 4.5, 939; 493/108, 154, 907, 96
See application file for complete search history.

(56) References Cited

U.S. PATENT DOCUMENTS

| | | | |
|---|---|---|---|
| 2014/0161944 A1* | 6/2014 | Briganti | A23G 3/566 426/138 |
| 2015/0154792 A1 | 6/2015 | Shi et al. | |
| 2016/0180497 A1* | 6/2016 | Halle | G06T 3/005 345/643 |

OTHER PUBLICATIONS

Anonymous "Curved Dielines & Warping Tutorial—part 1, Tuckyhut" Jan. 14, 2016, Retrieved from the Internet: http://tuckyhut.com/curved-dielines-and-warping-tutorial-part-1-fitting-a-curved-dieline/ (retrieved on May 30, 2019).

Chengqing Tang et al, "A Rectification Algorithm for Distorted Images from Cone Surface", Wireless Communications Networking and Mobile Computing (WICOM), 2010 fith International Conference on, IEEE, Piscatway, NJ, USA, Sep. 23, 2010, pp. 1-4, XP031827756. ISBN: 978-1-4244-3708-5.

* cited by examiner

A: Original Rectangular Grid

B: Warped Grid

C: Centre Point

METHOD AND SYSTEM FOR RENDERING IMAGE ON CONICAL SURFACE

FIELD

The present disclosure relates to image generation, and more particularly to a method and system for rendering images on conical surfaces, for example on the outer sidewalls of paper cups.

BACKGROUND OF THE INVENTION

Paper cups for hot and cold beverages are widely used. These cups are either single-walled paper cups or double-walled paper cups and generally have a frusto-conical shape having an increasing diameter from the bottom towards the top. Double-walled cups are generally used for hot beverages such as coffee.

As mentioned above, paper cups are generally conically shaped and not cylindrical. FIG. 1 is an image of a typical frusto-conically shaped paper cup 10. Paper cups are designed to be conical so that they fit into one another for more efficient packing. Referring to FIG. 1, it is common to apply a logo 20 or other graphics onto an outer wall of the paper cup 10. The graphics typically are designed in 2D on a screen, applied to a planar sheet, and then wrapped around a 3D conical shape. Graphic designers for the print industry are not only familiar with designing in 2D but in rectangular blocks i.e. business cards, A4 pages etc. To design graphics to be applied to 3D conical structures takes much more effort and experience, and most designers find it a difficult task. All artwork must be "banana" or "fan" shaped in order to end up looking square on a 3D conical shape.

The graphic design process for paper cups is very complicated. As the shape of the cup is conical and not cylindrical it means in order for the final 3D graphics to appear straight when the cup is assembled, the graphics have to be curved correctly. This makes the graphic design very difficult for even the most experienced designers and impossible for a novice. Most graphics are provided in rectangular format to experienced cup designers who then have to manipulate the image in order to make it curved. They do this by warping and stretching the image. The problem with using this method is that certain images, especially logos, will change shape, for example a circle becomes an oval. These images have to be handled separately and positioned correctly to keep their shape and also look straight on the final product.

There are a number of well-known high end software applications that enable experienced designers to take a rectangle and apply warp/curve to match a pre-defined template. This process uses expensive offline software and requires a skilled designer to accomplish the task. It is a manual process that can take an experienced design about 30-40 minutes to create a basic design. They accomplish this by having the final curved grid on the screen, and by warping and moving all the graphics to fit the grid.

In view of the above, there is a need to provide a quick and efficient way of creating graphics for conical structures such as paper cups.

SUMMARY

According to the present disclosure there is provided a process as detailed in claim 1. Also provided is a system according to claim 10. Advantageous features are provided in the dependent claims.

BRIEF DESCRIPTION OF THE DRAWINGS

The present application will now be described with reference to the accompanying drawings in which.

DETAILED DESCRIPTION OF THE DRAWINGS

Figure 1:
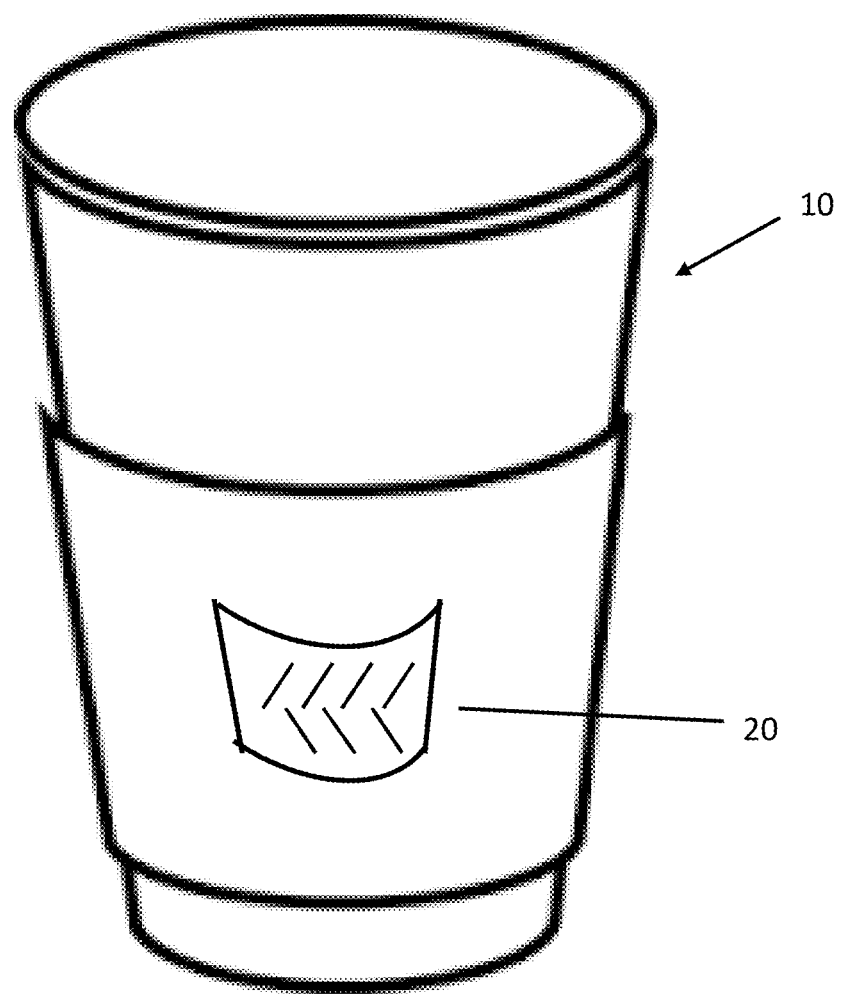
FIG. 1 is an image of a typical frusto-conically shaped paper cup.

The present disclosure provides a process and system configured to take a two-dimensional (2D) representation of an image and transform it, adjusting the aspect ratio, vertices and alignment to map the image onto a three dimensional (3D) format, such as for a conical object, for example a paper cup. The process provides the ability to transpose rectangular grid coordinates onto a curved conical shape and perform angular rotation of rectangular grid positions to curved coordinates.

An application for the process and system according to the present disclosure is for any type of graphic design for conically-shaped objects. Such conically-shaped objects include paper cups, plastic cups, Polyethylene terephthalate (PET) cups, ice-cream cones and pots, water cones, or any other conical object that can be stacked into one another. Paper cups generally have a frusto-conical shape having an increasing diameter from the bottom towards the top. Paper cups may be constructed from any suitable paper or cardboard on which graphics such as logos or text may be printed. The paper or cardboard may be coated with either PE (polyethylene) or PLA (polylactic acid).

The present disclosure provides an automated process for rendering an image on a conical surface, the process comprising:

transforming a two-dimensional (2D) planar representation of an image to a 2D planar representation of the image configured for a conical shape;

applying the 2D transformed representation onto a planar template; and manufacturing a conically-shaped object from the planar template on which the 2D transformed representation has been applied.

The process may include operating a processor of a computing device to: receive a 2D planar representation of an image; determine dimensions of the conical shape; and apply a transformation formula to the 2D planar representation according to the dimensions of the conical shape to obtain the 2D planar representation of the image configured for the conical shape The process may include receiving a user selection of a product size and shape required. More particularly, the user can select the size and shape of a conical object on which it is desired to print an image such as an artwork graphic, text or and/or logo. The process includes receiving a 2D planar representation of the image. The user may have previously prepared the 2D planar representation of the image. The 2D planar representation of the image may have been prepared using specialised computer software. The 2D planar representation of the image may be configured to be in the form of an easy to use rectangular template. In this regard, the rectangular template may have rectangular grid coordinates.

According to an embodiment of the present disclosure, a transformation formula is then applied to the 2D planar representation of the image based on the dimensions of the conical shape selected. The application of the transformation formula produces a 2D transformed representation of the image configured for the conical shape. The 2D transformed representation of the image configured for the conical shape may appear as a warped image on a planar surface. When the 2D transformed representation of the image is applied to the conical shape, the image will appear to be perfectly rendered and aligned. This process has particular application in the printing of images, text, logos or graphics onto conical surfaces such as paper cups.

Figure 2:
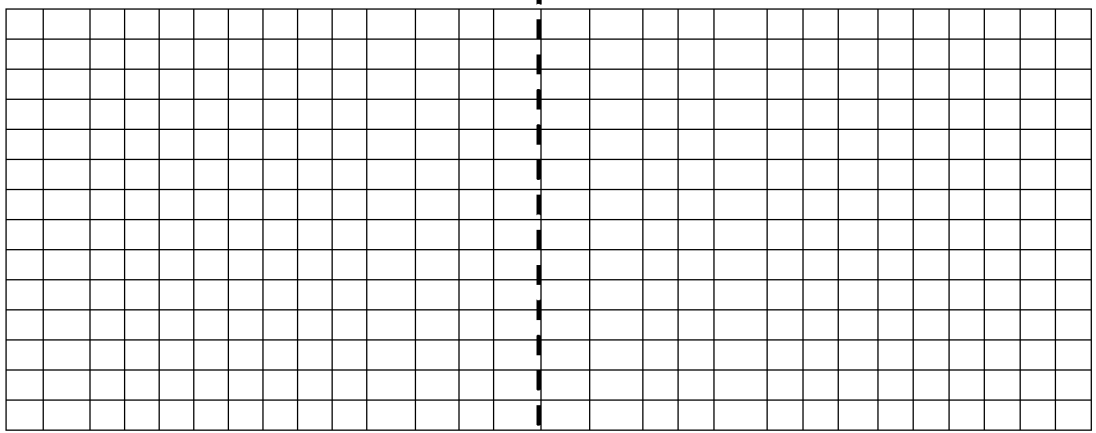
FIG. 2 illustrates an original planar rectangular image representation transformed to a warped representation.
Figure 2:
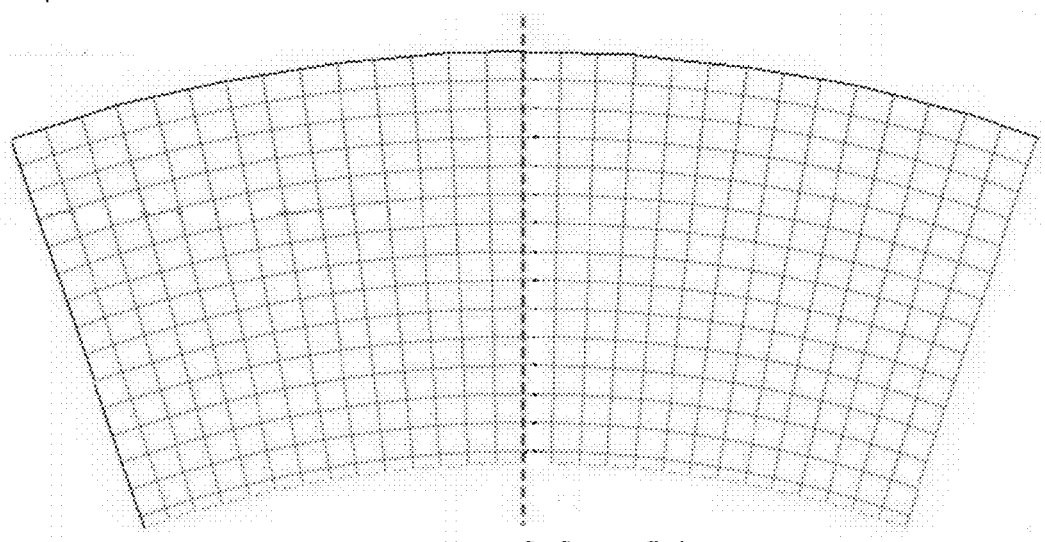
Figure 3:
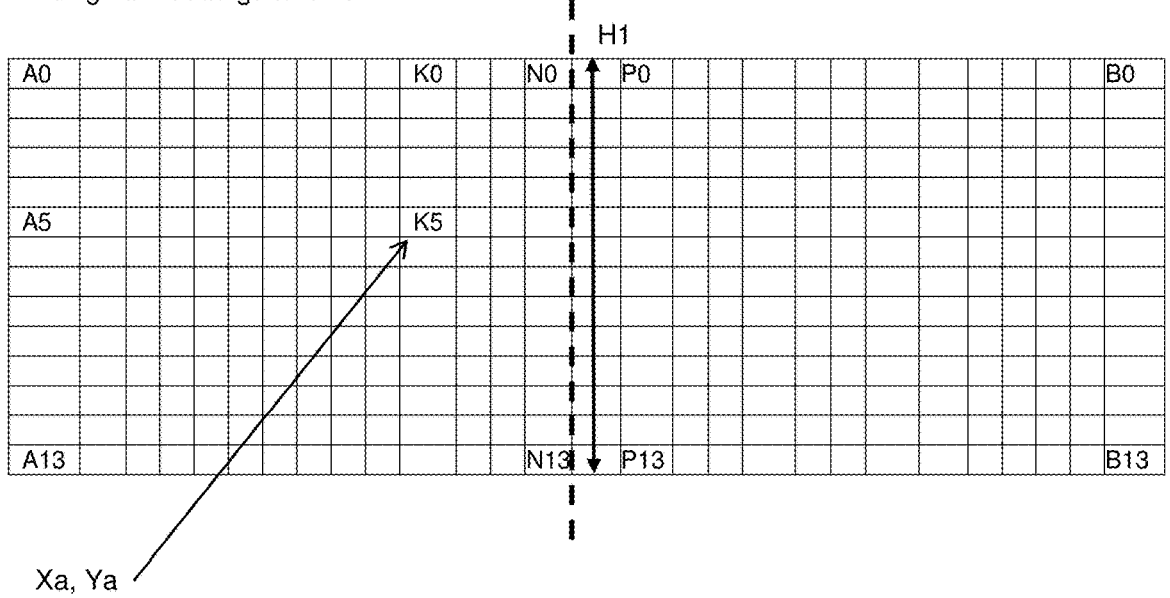
FIG. 3 illustrates a 2D rectangular image representation warped to suit a conical 3D shape.
Figure 3:
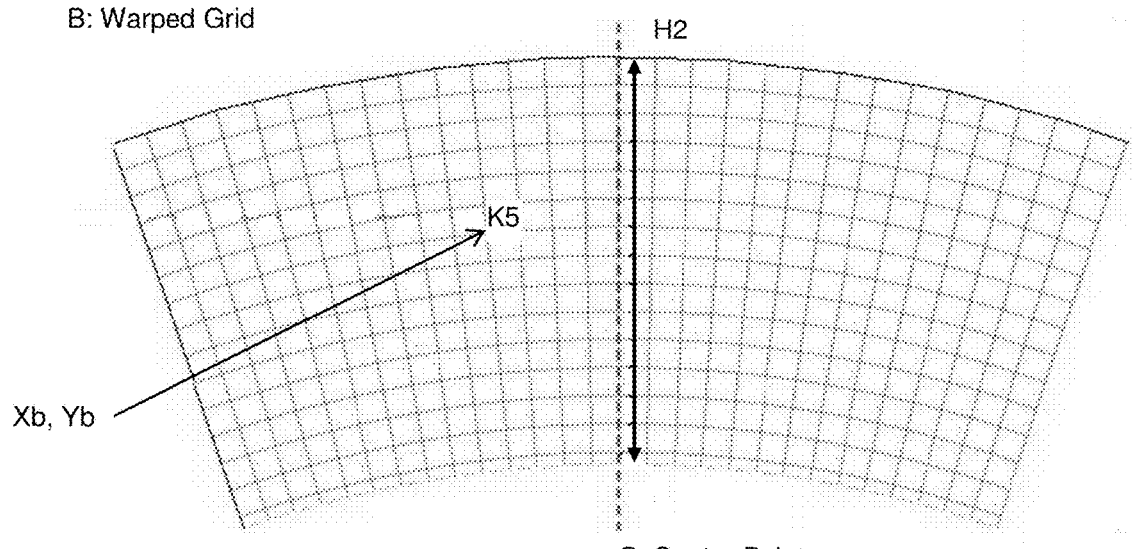

As mentioned above, the process according to the present disclosure includes warping the 2D planar representation of the image to facilitate wrapping the image. As explained above, the 2D planar representation of the image may be provided on a rectangular template. Standard graphic design tools can perform such warping, but it is a manual positioning process which takes an experienced graphic design quite some time to execute. The process according to the present disclosure is illustrated in FIG. 2 which illustrates an original planar rectangular image representation transformed to a warped representation. The overall dimensions or canvas size of the rectangular template are increased when a 2D rectangular template is warped to suit a conical 3D shape, as illustrated in FIG. 3. A position X1, Y1 which exists on the flat 2D coordinates may be transposed to new coordinates X2, Y2 and rotated so that the graphics are not distorted when applied to a conical shape. Variables involved in the mapping from 2D rectangular grid coordinates to 2D warped grid coordinates for wrapping an image around a conically-shaped object, include:

k (%): ratio correction for the xy grid post warping. When one warps a 2D planar image for a 3D object it necessary to adjust the size of the 2D planar image to fit the final 3D object accurately. This ratio adjustment has to be calculated in order to plot the coordinates correctly. The ratio is different per conical shape based on the final 3D template. The k value is a ratio of the y-axis height of the 2D planar representation of the image (H1) to a y-axis height of the transformed 2D planar representation of the image configured for the conical shape (H2). It will be understood by the skilled person that the y-axis height of the transformed 2D planar representation of the image configured for the conical shape is based on the size of the specific conical shape concerned.

θ (degrees): apex angle of the conical shape. This angle will change per conical shape and is based on the angle of the conical shape in question.

Px: number of pixels on horizontal axis
Py: number of pixels on vertical axis
Xa: position of point on x-axis of rectangular grid
Ya: position of point on y-axis of rectangular grid
Xb: adjusted position on x-axis of warped grid
Yb: adjusted position on y-axis of warped grid
w: width of grid
h: height of grid H1: y-axis height of the 2D planar representation of the image
H2: y-axis height of the transformed 2D planar representation of the image configured for the conical shape
k: H1/H2

To transpose coordinates Xa,Ya on a rectangular grid to coordinates Xb,Yb on a warped grid, the following transformation formula may be applied, according to an embodiment of the present disclosure:

$$Xb = \cos(\text{radians}(90 - (\theta*((Xa*k) - ((Px*k)/2))/((Px*k)/2))))*(((Py*k) - (Ya*k)) + (w-h))$$

$$Yb = h(((Py*k) - (Ya*k)) - ((((Py*k) - (Ya*k)) + (w-h)) - (\cos((\text{radians}((\theta*((Xa*k)((Px*k)/2))/((Px*k)/2))))*(((Py*k) - (Ya*k)) + (w-h)))))$$

When the conically-shaped object is manufactured from the planar template, the rendered image may be uncurved/dewarped and positioned and angled correctly so as to appear straight.

The transformation formula above applied to artwork ensures that the artwork is perfectly curved so when the final conically-shaped object is manufactured, all of the artwork appears to be horizontally and vertically aligned, visually. The process ensures that critical parts of the artwork such as logos and photos are not warped or stretched by the process.

The resultant transformed image may be sent to an image applying module for applying the 2D transformed representation onto a planar template. The image applying module may comprise a printing apparatus for printing the 2D transformed representation onto a planar template such as paper or cardboard. Along with the transformed image, information regarding product and order quantity as well as preapproved artwork contained within the file may also be sent to the image applying module.

The overall process of the present disclosure reduces significantly a huge amount of administrative resources, meaning the process can be streamlined and a much lower order quantity can be achieved due to the cost savings in administrative and graphics handling. With conventional processes of manufacturing paper cups, it is just viable to produce orders as low as 1000 pieces due to the cost processing of graphics and administrative order handling (set up costs). By automating these steps as per the present disclosure, the "set up costs" per design are a fraction of conventional systems, meaning the viable quantity could be as low as 10 cups.

As mentioned above, the image applying module is configured for applying the 2D transformed representation onto a planar template. Image application such as printing may be configured to commence automatically once the transformed image file is sent to the image applying module.

The next stage in the process is the manufacturing of the conically-shaped object from the planar template on which the 2D transformed representation has been applied. The manufacturing process may be performed on a conical object forming apparatus. The manufacturing process may include forming, for example cutting, the conically-shaped object shape from the planar template on which the 2D transformed representation has been applied. The manufacturing process includes assembling the conically-shaped object. Once the conically-shaped object on which the 2D transformed representation has been applied is assembled, the product is ready for dispatch.

All critical information for the above-described process may be configured to be contained within the artwork and may be automatically scanned during each process, linking back to a master database. This may be referred to as a management information system. This link automatically allows production/dispatch staff, management, and customers to track production information and delivery dates throughout the entire process from the initial design to delivered product.

Figure 4:
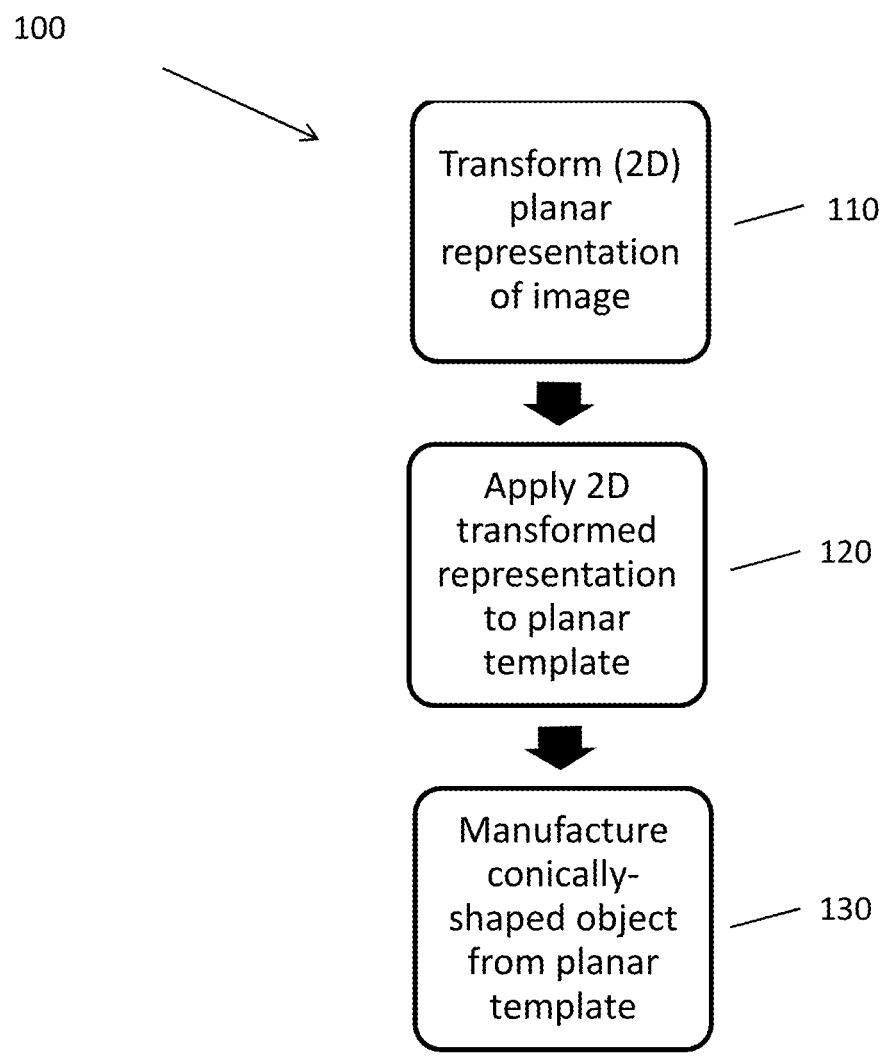
FIG. 4 illustrates an automated process for rendering an image on a conical surface, according to an embodiment of the present disclosure.

FIG. 4 illustrates an automated process 100 for rendering an image on a conical surface, according to an embodiment of the present disclosure. Referring to FIG. 4, the process 100 comprises transforming a two-dimensional (2D) planar representation of an image to a 2D planar representation of the image configured for the conical shape 110; applying the 2D transformed representation onto a planar template 120; and manufacturing a conically-shaped object from the planar template on which the 2D transformed representation has been applied 130.

Figure 5:
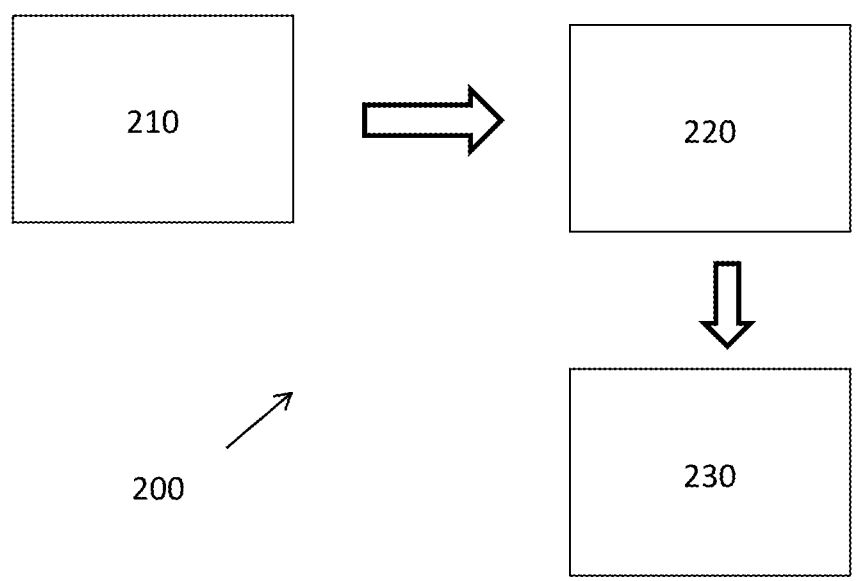
FIG. 5 is a block diagram illustrating an automated system for rendering an image on a conical surface, according to an embodiment of the present disclosure.

FIG. 5 illustrates an automated system 200 for rendering an image on a conical surface, according to an embodiment of the present disclosure. Referring to FIG. 5, the automated system 200 comprises a computing device 210 comprising at least one processor for transforming a two-dimensional (2D) planar representation of an image to a 2D planar representation of the image configured for the conical shape; an image applying module 220 for applying the 2D transformed representation onto a planar template; and a conical object forming apparatus 230 for manufacturing a conically-shaped object from the planar template on which the 2D transformed representation has been applied. The computing device 210, image applying module 220, and conical object forming apparatus 230 may be component parts of an overall integrated automated assembly line.

The computing device 210 comprises at least one processor configured to receive a 2D planar representation of an image, determine dimensions of the conical shape, and apply a transformation formula as shown above to the 2D planar representation according to the dimensions of the conical shape to obtain the 2D planar representation of the image configured for the conical shape.

The image applying module 220 may comprise a printing apparatus as described above.

The conical object forming apparatus 230 may comprise a paper cup forming apparatus. The conical object forming apparatus 230 is configured to manufacture a final assembled version of the conical object with the image applied thereto. The conical object forming apparatus 230 may be configured to produce the conically-shaped object shape from the planar template on which the 2D transformed representation has been applied. In an example of a paper cup forming apparatus, the manufacturing process may involve formation of a paper cup using conventional techniques, and optionally an outer sleeve for the cup. The paper cup may be formed from the template on which the planar template on which the 2D transformed representation has been applied. Using conventional techniques known to those skilled in the art, the paper cup may be manufactured on a first turntable by folding or curling the template and attaching two ends of the template together to form the paper cup having a frusto-conical shape.

After formation of the paper cup, the paper cup may be transferred to a second turntable for attachment of an outer sleeve. The method for applying the outer sleeve may be chosen as appropriate by those skilled in the art.

The final step in the manufacture of the conically-shaped object may be the ejection of the completed object for further processing such as packaging, labelling, etc. As will be understood by those skilled in the art, the above method may take place on a conical object forming apparatus 230 having one or more turntables. Such an apparatus may be configured to carry out all of the steps described above. In this way, a continuous and rapid method of manufacturing conically-shaped objects such as paper cups can be provided.

Figure 6:
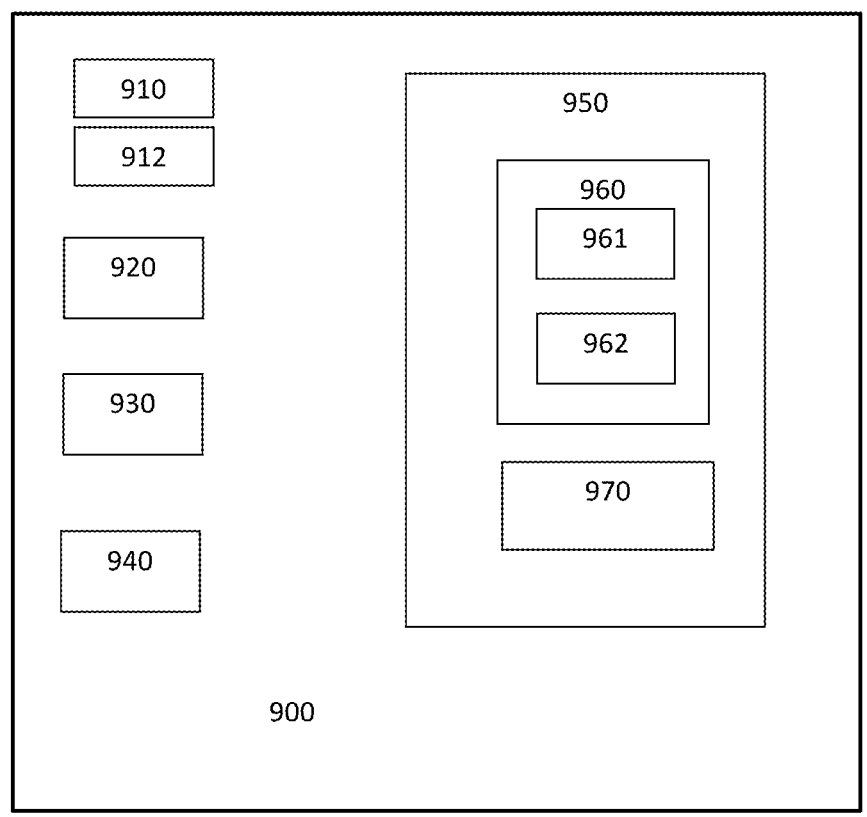
FIG. 6 is a block diagram illustrating a configuration of a computing device including various hardware and software components that function to perform the methods according to embodiments of the present disclosure.

FIG. 6 is a block diagram illustrating a configuration of a computing device 900 according to an embodiment of the present disclosure. The computing device 900 includes various hardware and software components that function to perform the image transformation techniques according to the present disclosure. The computing device 900 may be a component part of an overall integrated automated assembly line as described above. The computing device 900 may refer to the computing device 210 illustrated in FIG. 5. Referring to FIG. 6, the computing device 900 comprises a user interface 910, a processor 920 in communication with a memory 950, and a communication interface 930. The processor 920 functions to execute software instructions that can be loaded and stored in the memory 950. The processor 920 may include a number of processors, a multi-processor core, or some other type of processor, depending on the particular implementation. The memory 950 may be accessible by the processor 920, thereby enabling the processor 920 to receive and execute instructions stored on the memory 950. The memory 950 may be, for example, a random access memory (RAM) or any other suitable volatile or non-volatile computer readable storage medium. In addition, the memory 950 may be fixed or removable and may contain one or more components or devices such as a hard drive, a flash memory, a rewritable optical disk, a rewritable magnetic tape, or some combination of the above.

One or more software modules 960 may be encoded in the memory 950. The software modules 960 may comprise one or more software programs or applications having computer program code or a set of instructions configured to be executed by the processor 920. Such computer program code or instructions for carrying out operations for aspects of the systems and methods disclosed herein may be written in any combination of one or more programming languages.

The software modules 960 may include at least a first application 961 and a second application 962 configured to be executed by the processor 920. During execution of the software modules 960, the processor 920 configures the computing device 900 to perform various operations relating to the image transformation algorithms according to embodiments of the present disclosure, as has been described above.

Other information and/or data relevant to the operation of the present systems and methods, such as a database 970, may also be stored on the memory 950. The database 970 may contain and/or maintain various data items and elements that are utilized throughout the various operations of the system described above. It should be noted that although the database 970 is depicted as being configured locally to the computing device 900, in certain implementations the database 970 and/or various other data elements stored therein may be located remotely. Such elements may be located on a remote device or server—not shown, and connected to the computing device 900 through a network in a manner known to those skilled in the art, in order to be loaded into a processor and executed.

Further, the program code of the software modules 960 and one or more computer readable storage devices (such as the memory 950) form a computer program product that may be manufactured and/or distributed in accordance with the present disclosure, as is known to those of skill in the art.

The communication interface 940 is also operatively connected to the processor 920 and may be any interface that enables communication between the computing device 900 and other devices, machines and/or elements, including an image applying module and a conical object forming apparatus as described above. The communication interface 940 is configured for transmitting and/or receiving data. For example, the communication interface 940 may include but is not limited to a Bluetooth, or cellular transceiver, a satellite communication transmitter/receiver, an optical port and/or any other such, interfaces for wirelessly connecting the computing device 900 to the other devices.

The user interface 910 is also operatively connected to the processor 920. The user interface may comprise one or more input device(s) such as switch(es), button(s), key(s), and a touchscreen.

The user interface 910 functions to allow the entry of certain information about the image template and preferred options as discussed above. The user interface 910 functions to facilitate the capture of commands from the user such as an on-off commands or settings related to operation of the system described above.

A display 912 may also be operatively connected to the processor 920. The display 912 may include a screen or any other such presentation device that enables the user to view various options, parameters, and results. The display 912 may be a digital display such as an LED display. The user interface 910 and the display 912 may be integrated into a touch screen display.

The operation of the computing device 900 and the various elements and components described above will be understood by those skilled in the art with reference to the method and system according to the present disclosure.

The automated process and system described above according to the present disclosure provide a simple and efficient means of rendering an image on a conically-shaped object. The process does not have to be performed by an experienced designer, and can be performed at the manufacturing site itself. The automated process and system can form part of an integrated assembly line for large scale manufacturing of conically-shaped objects. The process can be performed by any designer and the print ready files can be sent to the manufacturer directly. This frees up huge resources at the manufacturing plant where the designers can take the final artwork and process them for printing immediately. The process allows for the setting up of web-to-print solutions where outside sources can design cups and approve artworks directly themselves. This enables these pre-approved files to go straight to the printing equipment without the need for designers at the plant. Web-to-print solutions currently do not exist anywhere within the industry for conical shapes and paper cups.

The simplicity of rectangular designing also opens up a new market for paper cup and general conical shapes, which is the ultra-short runs consumer market, i.e., order quantities lower than 1000 cups. Even a consumer with no cup design knowledge can place images and graphics on a rectangular shape with ease. The process can enable the display of a 3D model or a final product for previewing purposes as the design is being carried out in real time. This means the consumer can design cups for events such as: birthdays, weddings, celebrations, football games, and any other event that requires bespoke cups.

The words comprises/comprising when used in this specification are to specify the presence of stated features, integers, steps or components but does not preclude the presence or addition of one or more other features, integers, steps, components or groups thereof.

The invention claimed is:

1. An automated process for rendering an image on a conical surface, the automated process comprising:
   by applying a transformation formula, transforming a two-dimensional (2D) planar representation of the image to a 2D planar representation of the image configured for a conical shape;
   applying the transformed 2D planar representation of the image onto a planar template; and
   manufacturing a conically-shaped object from the planar template on which the transformed 2D planar representation of the image has been applied,
   wherein the transformation formula is represented as follows:

$$Xb=\cos(\text{radians}(90-(\theta^*((Xa^*k)-((Px^*k)/2))/((Px^*k)/2))))^*(((Py^*k)-(Ya^*k))+(w-h))$$

$$Yb=h(((Py^*k)-(Ya^*k))-((((Py^*k)-(Ya^*k))+(w-h))-(\cos((\text{radians}((\theta^*((Xa^*k)((Px^*k)/2))/((Px^*k)/2))))^*(((Py^*k)-(Ya^*k))+(w-h)))))$$

where:
k (%): ratio correction for the xy grid post warping, k value is a ratio of the y-axis height of the 2D planar representation of the image (H1) to a y-axis height of the transformed 2D planar representation of the image configured for the conical shape (H2), which is based on the size of the specific conical shape concerned
θ (degrees): apex angle of the conical shape
Px: number of pixels on horizontal axis
Py: number of pixels on vertical axis
Xa: position of point on x-axis of rectangular grid
Ya: position of point on y-axis of rectangular grid
Xb: adjusted position on x-axis of warped grid
Yb: adjusted position on y-axis of warped grid
w: width of grid
h: height of grid
H1: y-axis height of the 2D planar representation of the image
H2: y-axis height of the transformed 2D planar representation of the image configured for the conical shape
k: H1/H2.

2. The automated process of claim 1, comprising operating a processor to:
   receive the 2D planar representation of the image;
   determine dimensions of the conical shape; and
   apply the transformation formula to the 2D planar representation according to the dimensions of the conical shape to obtain the 2D planar representation of the image configured for the conical shape.

3. The automated process of claim 2, wherein the receiving the 2D planar representation of the image comprises receiving the planar template comprising the image.

4. The automated process of claim 3, wherein the planar template comprises a rectangular template comprising the image.

5. The automated process of claim 1, wherein the applying the transformed 2D planar representation of the image onto the planar template comprises printing the transformed 2D planar representation of the image onto the planar template.

6. The automated process of claim 1, wherein the manufacturing the conically-shaped object from the planar template comprises forming the planar template into the required shape for the conically-shaped object.

7. The automated process of claim 1, wherein the conically-shaped object is a paper cup.

8. The automated process of claim 1, wherein the manufacturing the conically-shaped object from the printed planar template comprises using a conical object forming apparatus to produce the conically-shaped object.

9. An automated system for rendering an image on a conical surface, the automated system comprising:
  a computing device comprising at least one processor for applying a transformation formula and resultantly transforming a two-dimensional (2D) planar representation of the image to a 2D planar representation of the image configured for a conical shape;
  an image printing apparatus for printing the transformed 2D planar representation of the image onto a planar template; and
  a conical object forming apparatus for manufacturing a conically-shaped object from the planar template on which the transformed 2D planar representation of the image has been applied,
  wherein the transformation formula is represented as follows:

$$Xb = \cos(\text{radians}(90-(\theta*((Xa*k)-((Px*k)/2))/((Px*k)/2))))*(((Py*k)-(Ya*k))+(w-h))$$

$$Yb = h(((Py*k)-(Ya*k))-((((Py*k)-(Ya*k))+(w-h))-(\cos((\text{radians}((\theta*((Xa*k)((Px*k)/2))/((Px*k)/2))))*(((Py*k)-(Ya*k))+(w-h)))))$$

where:
k (%): ratio correction for the xy grid post warping, k value is a ratio of the y-axis height of the 2D planar representation of the image (H1) to a y-axis height of the transformed 2D planar representation of the image configured for the conical shape (H2), which is based on the size of the specific conical shape concerned
θ (degrees): apex angle of the conical shape
Px: number of pixels on horizontal axis
Py: number of pixels on vertical axis
Xa: position of point on x-axis of rectangular grid
Ya: position of point on y-axis of rectangular grid
Xb: adjusted position on x-axis of warped grid
Yb: adjusted position on y-axis of warped grid
w: width of grid
h: height of grid
H1: y-axis height of the 2D planar representation of the image
H2: y-axis height of the transformed 2D planar representation of the image configured for the conical shape
k: H1/H2.

10. The automated system of claim 9, wherein the at least one processor is configured to:
  receive the 2D planar representation of the image;
  determine dimensions of the conical shape; and
  apply the transformation formula to the 2D planar representation according to the dimensions of the conical shape to obtain the 2D planar representation of the image configured for the conical shape.

11. The automated system of claim 10, wherein the receiving the 2D planar representation of the image comprises receiving the planar template comprising the image.

12. The automated system of claim 11, wherein the planar template comprises a rectangular template comprising the image.

13. The automated system of claim 10, wherein the conical object forming apparatus is configured to cut the planar template into the required shape for the conically-shaped object.

14. The automated system of claim 10, wherein the conical object forming apparatus comprises a paper cup forming apparatus.

* * * * *